US011030224B2

(12) United States Patent
Jin et al.

(10) Patent No.: US 11,030,224 B2
(45) Date of Patent: Jun. 8, 2021

(54) DATA IMPORT AND RECONCILIATION

(71) Applicant: SAP SE, Walldorf (DE)

(72) Inventors: Xing Jin, Vancouver (CA); Sumedha Sharma, Vancouver (CA); Jonathan Tiu, Surrey (CA); Mohsen Asadi, Vancouver (CA); Sae-Won Om, Burnaby (CA); Anna Chen, Surrey (CA)

(73) Assignee: SAP SE, Walldorf (DE)

( * ) Notice: Subject to any disclaimer, the term of this patent is extended or adjusted under 35 U.S.C. 154(b) by 821 days.

(21) Appl. No.: 15/684,113

(22) Filed: Aug. 23, 2017

(65) Prior Publication Data

US 2019/0065528 A1 Feb. 28, 2019

(51) Int. Cl.
*G06F 16/29* (2019.01)

(52) U.S. Cl.
CPC .................................. *G06F 16/29* (2019.01)

(58) Field of Classification Search
CPC ...... G06F 16/29; G06F 16/387; G06F 16/487; G06F 16/587; G06F 16/687; G06F 16/787; G06F 16/909
See application file for complete search history.

(56) References Cited

U.S. PATENT DOCUMENTS

| | | | | |
|---|---|---|---|---|
| 6,772,142 B1 * | 8/2004 | Kelling | ................... | G06F 16/29 707/724 |
| 6,859,791 B1 * | 2/2005 | Spagna | ................... | G06F 21/10 705/51 |
| 7,054,743 B1 * | 5/2006 | Smith | ................... | G01C 21/30 701/428 |
| 8,688,688 B1 * | 4/2014 | Murphy | ............. | G06F 16/3338 707/714 |
| 2002/0055924 A1 * | 5/2002 | Liming | ................... | H04L 67/18 |
| 2002/0087550 A1 * | 7/2002 | Carlyle | ................ | G06F 16/353 |
| 2008/0189257 A1 * | 8/2008 | Wiseman | ............ | G06F 16/3337 |
| 2010/0205194 A1 * | 8/2010 | Bezancon | ............... | G06F 16/29 707/758 |
| 2010/0217480 A1 * | 8/2010 | Link, II | ................. | G06F 16/41 701/31.4 |
| 2013/0159507 A1 * | 6/2013 | Mason | ................... | G06Q 10/10 709/224 |
| 2013/0262152 A1 * | 10/2013 | Collins | .................. | G06Q 40/08 705/4 |
| 2014/0095509 A1 * | 4/2014 | Patton | .................... | G06F 16/29 707/740 |
| 2014/0310162 A1 * | 10/2014 | Collins | ............... | G06F 3/04842 705/39 |
| 2018/0014161 A1 * | 1/2018 | Warren | ............. | G06F 16/24578 |
| 2018/0288386 A1 * | 10/2018 | Lazarow | ............. | H04N 13/366 |

* cited by examiner

Primary Examiner — Robert W Beausoliel, Jr.
Assistant Examiner — Nirav K Khakhar
(74) Attorney, Agent, or Firm — Fountainhead Law Group P.C.

(57) ABSTRACT

In one embodiment, the present disclosure pertains to data import and reconciliation. In one embodiment, a location field is compared against alternative geo-descriptors to link the location fields to areaIDs and geospatial shapes. A similarity search is performed against unmatched location fields. In one example embodiment, a table is generated with unique location IDs, areaIDs, and metadata describing the results of the comparison.

20 Claims, 6 Drawing Sheets

Table 401:

| ID | country | sales | product |
|---|---|---|---|
| 1 | Untied States | 5M | shirts |
| 2 | UNA | 3M | pants |
| 3 | USX | 1M | socks |
| 4 | Cnda | 2M | pants |
| 5 | Canada | 500K | shirts |
| 6 | Columbia | 2.5M | socks |
| 7 | U.S.A. | 4M | shirts |

Table 405:

| areaID | ISO3 | ISO2 |
|---|---|---|
| 1000 | USA | US |
| 1001 | CAN | CA |
| 1002 | FRA | FR |

Table 403:

| Master geo-descriptor | areaID |
|---|---|
| United States | 1000 |
| Canada | 1001 |
| France | 1002 |
| Columbia | 1003 |
| Gran Columbia | 1004 |

Table 404:

| Alt Geo-Descriptor | areaID | locale |
|---|---|---|
| United States | 1000 | EN |
| US | 1000 | EN |
| USA | 1000 | EN |
| U.S.A. | 1000 | EN |
| Etas Unis | 1000 | FR |
| Estados Unidos | 1000 | SP |

Table 402:

| areaID | shape | Level |
|---|---|---|
| 1000 | \<polygon_US\> | 1 |
| 1001 | \<polygon_CA\> | 1 |
| 1002 | \<polygon_FR\> | 1 |
| 1003 | \<polygon_COL\> | 1 |
| 1004 | \<polygon_GCOL\> | 1 |
| 1100 | \<polygon_CA\> | 2 |
| 1102 | \<polygon_BC\> | 2 |
| 1110 | \<polygon_LA\> | 3 |
| 1111 | \<polygon_LAC\> | 4 |

DATA IMPORT AND RECONCILIATION

BACKGROUND

The present disclosure relates to computing and data processing, and in particular, to importing and reconciling data.

The explosive growth of data stored in computer networks has given rise to a need for improved ways to access and use the data to produce meaningful results. Geospatial visualizations help users make use of such data by allowing a user to display data geographically, such as on a map. One challenge with such systems is that users may be required to import large data sets into a geospatial system. If the imported data sets represents locations differently than the geospatial system, then the system may not function properly. For example, if customer data stores a country field as "US", but the country is represented in the geospatial system as "United States", then the country field for the customer data in the US may not be able to be displayed geospatially. Other location information may simply be misspelled. For example, if customer data for country is entered as "CNDA", but the country is represented in the geospatial system as "CANADA", then the country for the customer data in Canada may not be able to be displayed geospatially.

Another challenge for such systems is that customers may require that their data remained unchanged. For example, if an entity uploads raw data (e.g., sales data for store locations around the world), the system may be precluded from modifying the original data. This is particularly challenging for large data sets that cannot be copied and stored without a cost penalty.

The present disclosure provides techniques for importing and reconciling data in a geospatial system, for example.

SUMMARY

In one embodiment, the present disclosure pertains to data import and reconciliation. In one embodiment, a location field is compared against alternative geo-descriptors to link the location fields to areaIDs and geospatial shapes. A similarity search is performed against unmatched location fields. In one example embodiment, a table is generated with unique location IDs, areaIDs, and metadata describing the results of the comparison.

BRIEF DESCRIPTION OF THE DRAWINGS

FIG. 4 illustrates example data to illustrate an embodiment.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
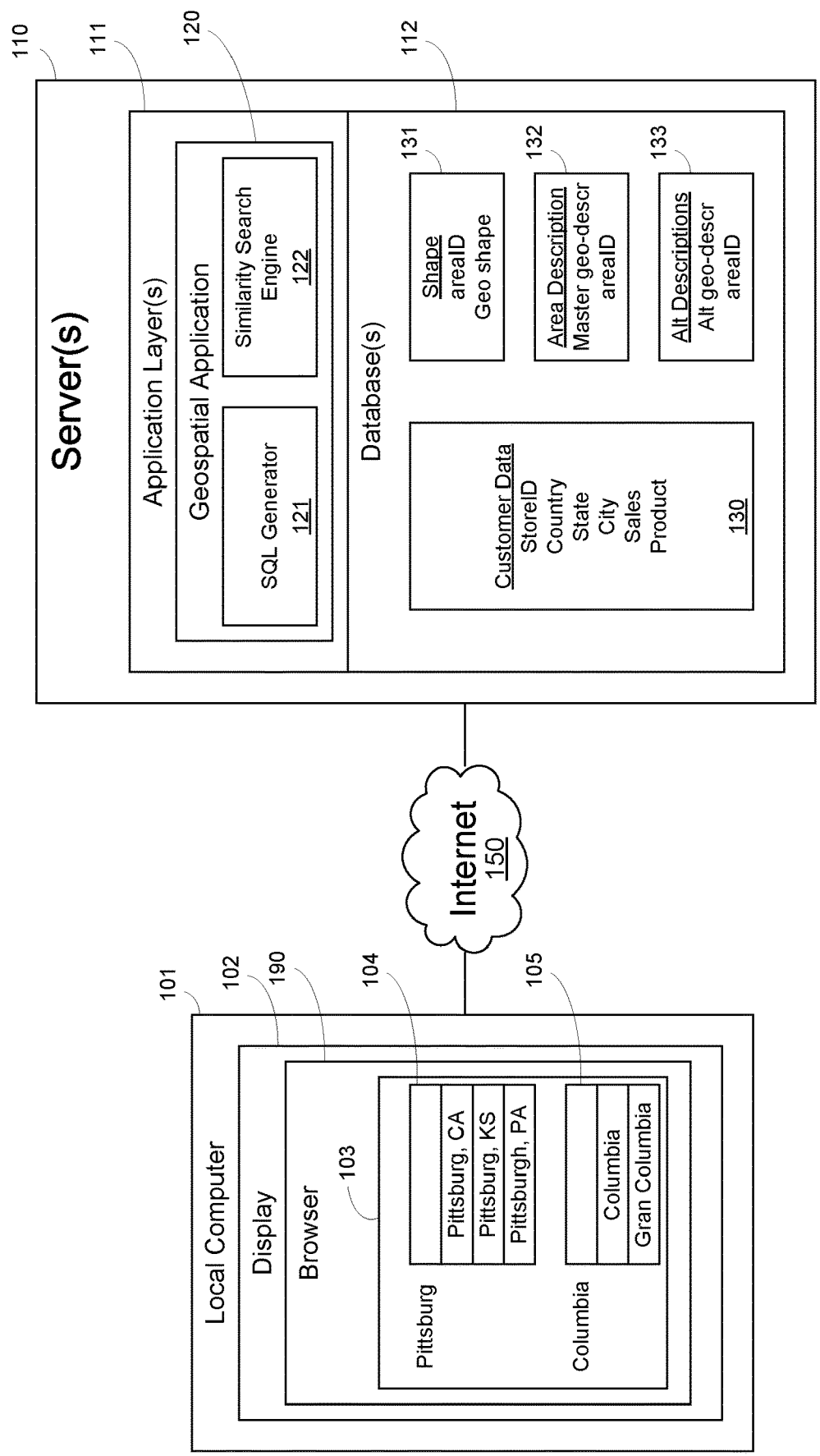
FIG. 1 illustrates importing and reconciling data according to one embodiment.

FIG. 1 illustrates importing and reconciling data according to one embodiment. Features and advantages of the present disclosure include receiving a data set and reconciling data in the data set to operate with internal representations of locations and geospatial elements, such as shapes, for example. Once reconciled, the data set may be displayed geospatially. Some embodiments may advantageously allow data to be reconciled and geospatially displayed without changing the data set itself.

The data import and reconciliations techniques described herein may be implemented as computer code (i.e., software) on one or more computers. For example, one or more server computers ("Server(s)") 110 may execute code for processing and storing data according to the methods described herein. Servers 110 may be a cloud computing network of computers, for example, an on-prem server network, for example, or both. "On-prem" typically refers to a network of computers (e.g., servers) on the premises (in the building) of the entity using the software, rather than at a remote facility such as a server farm or cloud. In this example, server computers 110 may host one or more applications layers ("Application Layer(s)") 111 and one or more databases ("Database(s)") 112. Application layers 111 may include software for processing data, interfacing with client computers, and interfacing with databases, for example. In some implementations, application layers 111 may be an application layer of the database system itself, for example. Examples of databases 112 are typically structured data repositories that store data as tables, such as systems by SAP®, Oracle®, Salesforce®, and the like, for example. Application layers 111 may be application servers (software servers), for example, and may comprise customized code for receiving inputs from a client, accessing data in one or more databases 112, processing data, sending and receiving data to/from the client, and storing data in the databases 112, for example. Client computers may include numerous computer systems that access the servers remotely, such as a local computer 101 running a browser 190 in a display 102, for example, In this example, application layer 111 includes a geospatial application 120. As mentioned above, geospatial application 120 may enable users on client computers to access data over the internet 150 and display data geographically. For example, customer data 130 may be imported and stored in database 112 from another server on the internet 150 (not shown). Customer data 130 may include, for example, a unique location identification (e.g., a store ID), location information such as, country, state, and city, and sales data, such as sales (in dollars, $), and product (e.g., shirts, pants, skirts, etc. . . . ). Thus, in this example, sales data for a particular store in Pittsburgh, Pa., USA may be represented on a map together with sales data for other stores in other locations using the customer data 130. The maps for different regions (e.g., countries, states, cities, etc.) may be stored as complex polygons ("shapes") in a database, where particular maps are linked to customer data using location information in the customer data.

As mentioned above, in some cases, the descriptors for country, state, city, or other regional descriptors (e.g., other countries or other sub-regions) may not match the geo-descriptors used by the geospatial application 120. For example, if the country field in a data set is misspelled as "CNDA" and the geo-descriptor used by the geospatial application 120 is "CANADA," then the customer data for any row having country="CNDA" may not be recognized by the geospatial application 120. Features and advantages of the present disclosure include a data reconciliation method for linking misspelled or alternative geo-descriptors in an input data set with the constructs in a geospatial application.

In one embodiment, database 112 includes a shape table 131 for storing a plurality of unique area identifications ("areaID") each associated with a corresponding geospatial shape. For example, a complex polygon representing the United States may be stored in table 131 and associated with one and only one unique areaID (e.g., 1000). Similarly, a complex polygon representing Canada may be stored in table 131 and associated with another unique areaID (e.g., 1001). Likewise, complex polygons (or shapes) for other countries, states, cities, provinces, or any regions and multiple layers of subregions may be stored in shape table 131 and associated with unique areaIDs to facilitate accessing the shapes, for example. Database 112 may further include an area description table 132 for storing a plurality of master geo-descriptors each associated with one the unique areaIDs. For example, areaID 1000 may be associated with a master geo-descriptor, which may be a string "United States," for example. Similarly, another areaID 1001 may be associated with another master geo-descriptor, which may be a string "Canada." Accordingly, if customer data includes a country field with the string "United States" or "Canada," the data associated with such country fields can be linked to particular map shapes in the shape table using the areaID and displayed geospatially.

However, if customer data does not exactly match the master geo-descriptors in table 132, such data may not be available for geospatial display. Accordingly, features and advantages of the present disclosure include an alternate descriptions table 133 in database 112 for storing a plurality of alternative geo-descriptors in association with the unique areaIDs. For instance, each unique areaID may be associated with a plurality of the alternative geo-descriptors, where the alternative geo-descriptors are alternate representations of each of the master geo-descriptors. For example, areaID 1000 associated with master geo-descriptor "United States" in table 132 may be associated with each of a plurality of alternative geo-descriptors: "US", "USA", "U.S.A.", "Estados Unidos", "Etas Unis", etc. . . . . As described in more detail below, the alternative descriptions table 133 may be used as part of a two-step method for reconciling the location fields in the customer data so they can be linked to the shapes in the shape table 132.

For example, in one embodiment, geospatial application 120 includes a SQL generator component 121 and a similarity search engine 122. During reconciliation of the imported customer data 130, the SQL generator 121 may generate SQL statements to compare data elements in at least one location field of the customer data set to the alternative geo-descriptors. The SQL statements may be generated automatically based on the customer's imported data set and executed natively in database 112 using a database SQL execution engine, for example, to advantageously improve the speed of data processing. For example, if the customer data includes "US" in a country field rather than "United States", then a match will occur with the alternate descriptor "US" in table 133. When a particular data element matches one of the alternative geo-descriptors, then the unique areaID associated with the matched one of the alternative geo-descriptors can be determined and the associated data may be linked to a particular shape in the shape table using the unique areaID. However, when a particular data element does not match any of the plurality of alternative geo-descriptors, then a similarity search (e.g., a Fuzzy Search) may be performed of the particular data element against the plurality alternative geo-descriptors. The similarity search may return a result set comprising one or more of the plurality alternative geo-descriptors having a likelihood greater than a threshold, for example. Each alternative geo-descriptor in the result set may have an associated likelihood greater than the threshold, where the likelihood indicates, for example, a probability that a particular alternative geo-descriptor is the correct geo-descriptor referred to by the customer's data element. As illustrated in FIG. 1, multiple potential results may be displayed to a user (e.g., in a browser) at 104. In this example, the customer data may comprise a country field "US" and a city field of "Pittsbrg" (i.e., a misspelling of "Pittsburgh" or "Pittsburgh"). A similarity search may produce a result set with three geo-descriptors from the list of alternate geo-descriptors in table 133: Pittsburgh, Calif.; Pittsburgh, Kans., and Pittsburgh, Pa., for example. The result set may be sent from the geospatial application on the server to a local client computer over internet 150, for example, and presented to a user in a drop down window. The user may select the correct geo-descriptor, and the correct geo-descriptor is sent back to the geospatial application. The selected geo-descriptor, which is one of the alternative geo-descriptors, may be used to determine the unique areaID and associated shape, for example.

In another embodiment described in more detail below, a country field in an imported data set may match multiple alternate geo-descriptors. For example, if a country field in the customer data set 130 includes "Columbia", a match may be triggered with both "Columbia" having one area ID and "Gran Columbia" having another areaID. In the case of multiple matches, the multiple matched geo-descriptors are sent to the user for selection as shown at 105.

Figure 2:
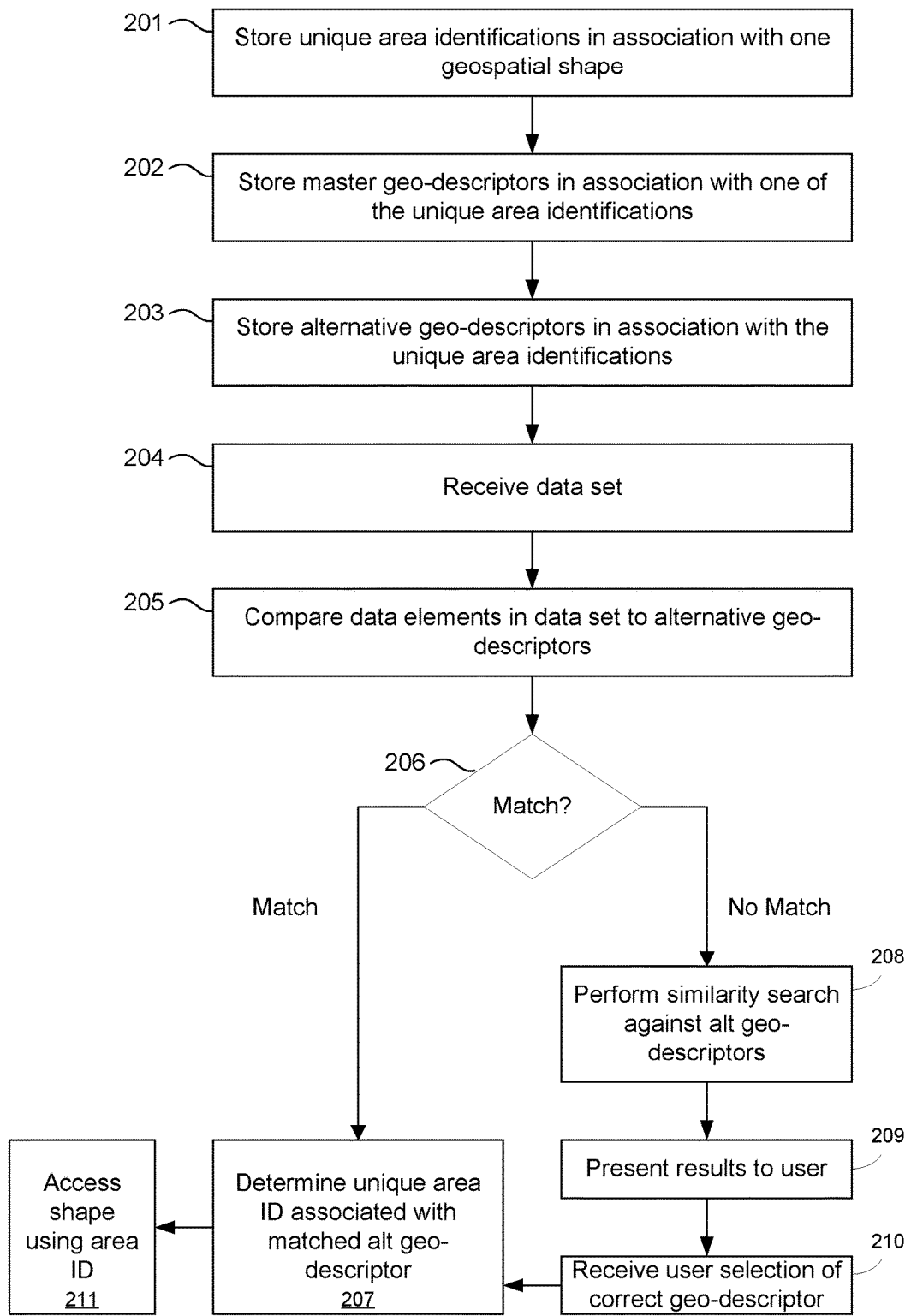
FIG. 2 illustrates a method of according to an embodiment.

FIG. 2 illustrates a method according to an embodiment. At 201, unique areaIDs are stored in association with geospatial shapes, which may represent countries, states, provinces, cities, counties, and any of multiple hierarchical regions, for example. One areaID is typically associated with one shape, for example. At 202, master geo-descriptors are stored in association with one of the unique areaIDs, such as [United States:1000; Canada:1001; California: 1100; British Columbia:1101; Los Angeles:1110; Vancouver:1120, West Valley Mission College District:1111; DeAnza College District:1112], for example. At 203, alternative geo-descriptors are stored in association with the unique areaIDs. At 204, the system may receive a data set. As mentioned above, the system may be a cloud computer system of networked servers running a database and application server, and the data set is loaded into the database, for example, by a geospatial application running on the application server. At 205, data elements from the data set, such as location fields for country, state, or city, are compared to the alternative geo-descriptors. As described in more detail below, the comparison may be performed by joining the alternative geo-descriptors, master geo-descriptors, and shapes based on the areaIDs and generating SQL based on the schema of the imported data set to look for matches. If a match occurs at 206, then the unique areaID associated with the matched alternative geo-descriptor is determined at 207. If no match occurs for a particular data element, then a similarity search is performed at 208 against the alternative geo-descriptors.

The similarity search results (i.e., the alternative geo-descriptors above a threshold) are presented to a user at 209. At 210, the user selected alternative geo-descriptor is received in the geospatial application and used to determine the unique areaID at 207. At 211, the shapes are accessed using the areaIDs during "consumption time," which is time the imported data set is displayed geospatially.

Figure 3:
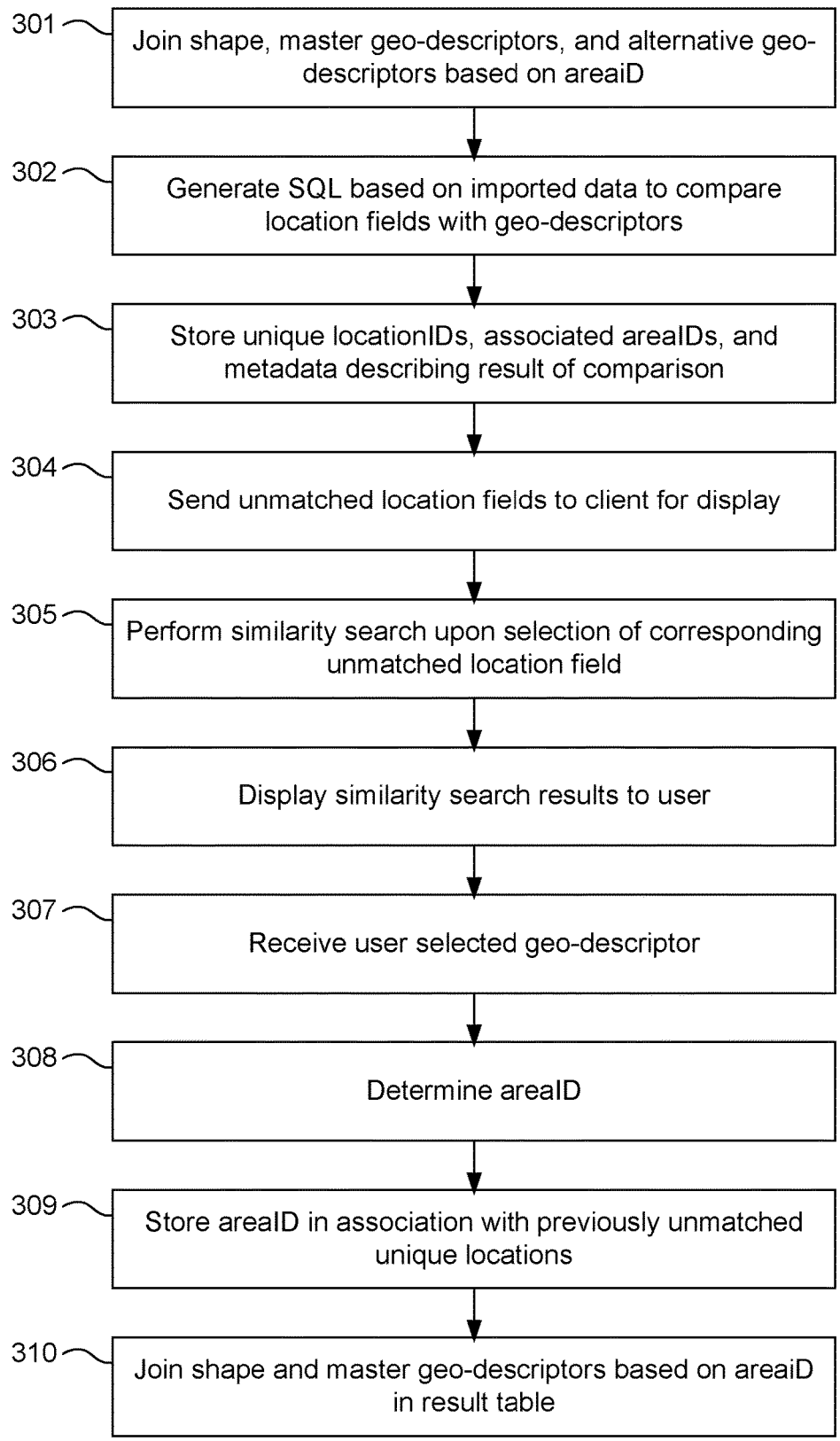
FIG. 3 illustrates a method of according to another embodiment.

FIG. 3 illustrates a data reconciliation method according to another embodiment. The process shown in FIG. 3 is explained using example data shown in FIGS. 4-5. As mentioned above, a customer data set may be imported and stored in a database, for example. The database may also store geospatial shapes (e.g., polygons) for different regions associated with unique areaIDs in a shape table, master geo-descriptors associated with unique areaIDs in an area description table, and alternative geo-descriptors in an alternative description table, for example. FIG. 4 illustrates an example customer data set 401, an example shape table 402, an example area description table 403, and an alternative description table 404. While the data in these tables mostly pertains to countries, it is to be understood that other and/or additional regions may be included as fields in customer data sets and tables 402-404 as described further below. For example, shape table 402 includes areaID 1110 for Los Angeles County and areaID 1111 for the City of Los Angeles ("LAC").

In this example, once the tables are stored in a database, the geospatial application can start processing the data. At 301, shapes, master geo-descriptors, and alternative geo-descriptors may be joined based on the areaIDs to create a view of the data as illustrated at 501 in FIG. 5. The following is an example of the code used to perform a join:

```
CREATE COLUMN VIEW "_SYS_BIC"."FPA_SPATIAL_DATA.ch/CH_DESC"
WITH PARAMETERS (indexType=6,
    joinIndex="
FPA_SPATIAL"."FPA_SPATIAL_DATA::SAMPLE.GEOGRAPHY_AREA",
    joinIndexType=0,
    joinIndexEstimation=0,
    joinIndex="
FPA_SPATIAL"."FPA_SPATIAL_DATA::SAMPLE.GEOGRAPHY_SHAPE",
    joinIndexType=0,
    joinIndexEstimation=0,
    joinIndex="
FPA_SPATIAL"."FPA_SPATIAL_DATA::SAMPLE.GEOGRAPHY_AREA_DESCRI
PTION",
    joinIndexType=0,#
    ......
```

Where GEOGRAPHY_SHAPE is a shape table, GEOGRAPHY_AREA is an area description table, and GEOGRAPHY_AREA_DESCRIPTION is an alternative description table. The resulting view is shown at 550 in FIG. 5. In one embodiment, the master geo-descriptors are also stored in the alternative description table with the alternative geo-descriptors. One advantage of embodiments that store master geo-descriptors in both the area description table and the alternative description table is that area names may be initially looked up in the area description table, which may have more unique areas IDs because there may not be alternative geo-descriptors for all areas, to produce faster results in some cases, for example.

Referring again to FIG. 3, at 302 a SQL generator may generate SQL based on the imported data set to compare the location fields with alternative geo-descriptors in table 403 in FIG. 4, for example. In one embodiment, the SQL generator takes the location columns from the imported dataset (for example, columns representing "Country" level, "State" level, and "City" level) as inputs and then through modularized calls, which may be designed for reuse, readability, and maintenance, creates a request in native SQL. The native SQL may runs against the database and store the results of a comparison with stored geo-descriptions. This native SQL is essentially a multi join of tables where it repeatedly self joins on the database view for each location level present (Country, State, City, etc.). In this example, the data is advantageously compared using native SQL executed in the database rather than at the application level to improve the speed of the comparison process. Accordingly, based on comparing customer data elements and stored geo-descriptions, a table may be generated that includes a field storing each unique location in the customer data set, a second field storing either none, one, or multiple unique areaIDs, and a third field storing a metadata describing a result of the comparing data elements step. For example, at 303, unique location IDs from the customer data, associated areaIDs (if matched), and metadata describing the result of the comparison are stored, for example, in a temporary results table.

Figure 5:
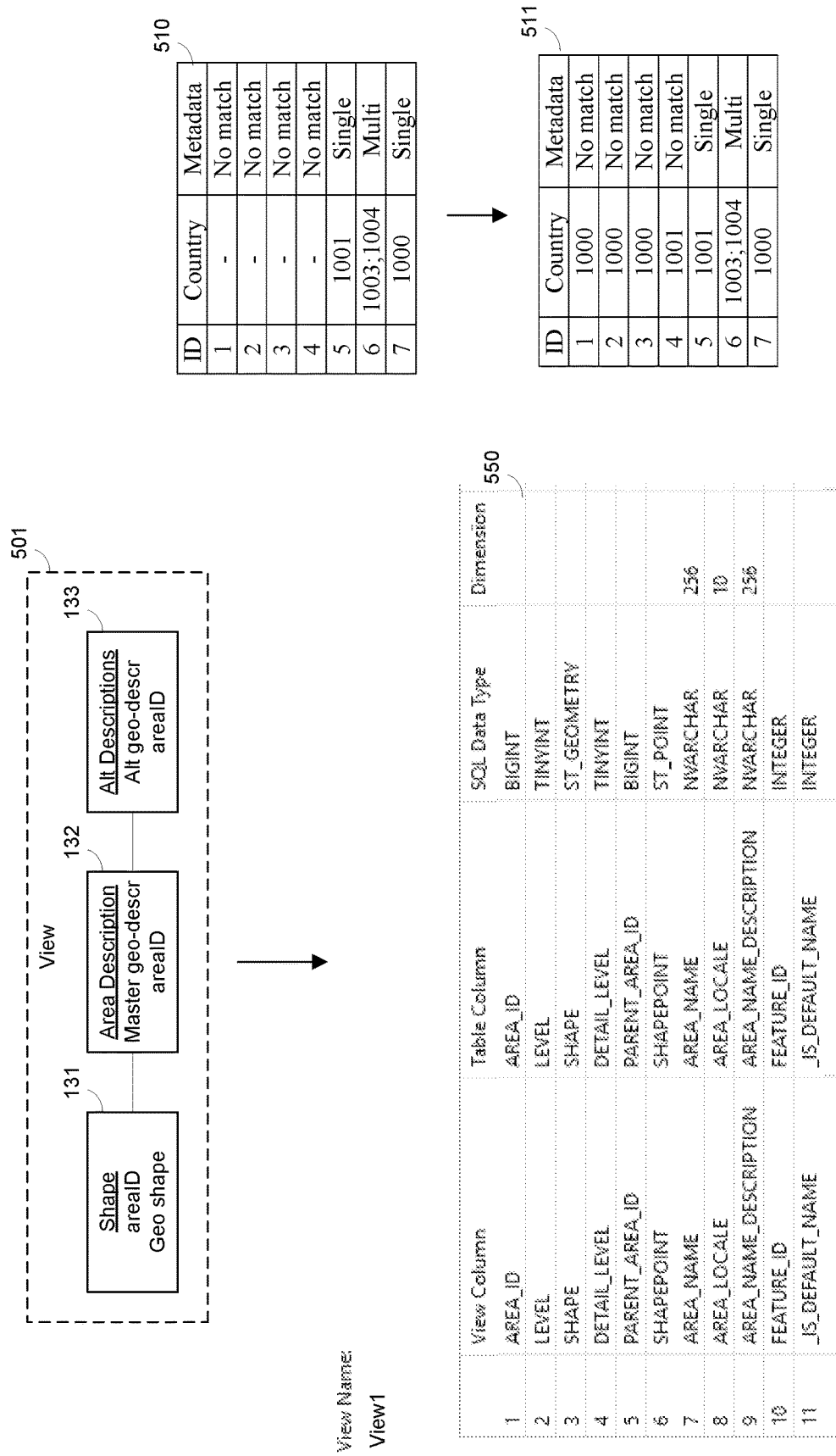
FIG. 5 illustrates example data to illustrate an embodiment.

An example temporary results table is shown at 510 in FIG. 5. In this example, unique location IDs may be storeIDs (e.g., an identification of a store having a unique location on a map). Referring to tables 401-404 in FIG. 4, table 510 illustrates that for store ID=1, the country field contained a misspelling ("Untied States"; note: Un-tied v. United), which did not match any of the alternative geo-descriptors in the alternative descriptor table 404. Thus, table 510 includes a "–" or other null character for country and a No Match description associated with ID=1 (row 1). The same result occurs in table 510 for IDs 2, 3, and 4 from customer data set 401 (null and No Match). However, for ID=5 in the customer data set, Canada is matched against the master geo-descriptor in table 403. When a match occurs, the areaID is stored in table 510 and the metadata describes a "Single" match. ID=6 in customer data set 401 illustrates a multi-match. In this example, "Columbia" may match two (2) master geo-descriptors—"Columbia" and "Gran Columbia". Thus, the areaIDs for both matches are stored in table 510 and the metadata is set to "Multi". For ID=7 in the customer data, the country field does not match the master geo-descriptor (here, "United States"), but it does match one of the alternative geo-descriptors included in the comparison through the view created at 301. Thus, a single match occurs automatically, and the areaID is set to 1000 and metadata is set to "Single". This example illustrates that the system may advantageously automatically match a potentially large portion of the data set using the alternative geo-descriptors, thereby reducing the number of fields that may require manual verification. Example SQL code for generating a result table 510 is shown in APPENDIX A.

Referring again to FIG. 3, in this example, once table 510 is generated, the unmatched location fields may be sent to a client for display and manual confirmation at 304. For example, a user interface (UI) on a client computer may display each of the unmatch locations in the customer data set. Referring again to table 401 in FIG. 4 and table 510 in FIG. 5, a UI may display "Untied States," "UNA," "USX," and "CNDA," based on the no match metadata in table 510. In one embodiment, data elements that do not match any of the plurality of alternative geo-descriptors may be sent for display to a user (e.g., in a browser or other UI). When a user selects an unmatched location, a similarity search may be triggered, for example. In this case, each unmatched location "Untied States," "UNA," "USX," and "CNDA" may be presented to a user in a UI next to a drop down menu. However, the drop down menu may only be populated with choices resulting from a similarity search when the menu selected and the similarity search executed. Accordingly, the similarity search may be performed only for one particular displayed data element when the user selects the particular displayed data element. This advantageously reduces the amount of processing required before displaying the unmatched locations to the user, for example, and may allow similarity results to be generated only when requested, for example.

At 305, a similarity search is performed for a unmatched location field displayed in the UI (e.g., when a user selects the unmatched location). A similarity search is sometimes referred to as a "Fuzzy Search." The similarity search is performed on the backend by a similarity search component of the geospatial application, for example. The similarity search component may receive a signal from the client computer triggering a similarity search and generate the following example code for a similarity search. The code below includes two (2) example calls for "Great Britian" and "Cnada".

obtaining the same location having different alternative locations that cause the same shape to be used twice during consumption time.

The above similarity searches also illustrate other example embodiments. For example, the above searches include a "LEVEL." Referring to FIG. 4, a geo-level descriptor ("level") may be stored in association with each shape, for example, in table 402. Here, a geo-level descriptor is associated with the unique area identifications. A geo-level descriptor may specify a geographic hierarchy, for example. For instance, country may be the highest level (Level=1), state or province may be another level (Level=2), subregions such as counties/cities may be yet another level (Level=3), and any number of additional hierarchical subregions may form additional levels, for example. As mentioned above, here Los Angeles County (LA) is level 3 and the City of Los Angeles (LAC) is level 4. In this example, if the geo-level descriptor is included in the view generated at 301, the geo-level descriptor advantageously limits the scope of the comparing step by eliminating locations that are not at the same level. Furthermore, geo-level descriptors improve the similarity search of the particular data element by executing the similarity search against a geo-level descriptor, for example. Such advantages may be substantial if tables 401-404 include several levels of location fields for country, state/province, county, and city, for example.

The above similarity searches also illustrate another example embodiment. For example, the above searches include an "AREA_LOCALE". Referring to FIG. 4, a locale may be stored in association with each alternative geo-descriptor, for example, in table 404. Here, a locale is stored in association with a plurality of alternative geo-descriptors. A locale may specify a language of a particular geo-descriptor, for example. For instance, one locale for alternative geo-descriptors for the United States may be "EN" for English for those geo-descriptors in the English language.

```
-- Example 1
-- User data is 'Great Britain'
-- Fuzzy match result is the area id for 'England'
SELECT TOP 10 SCORE( ) as "score", "AREA_ID"
from "_SYS_BIC"."FPA_SPATIAL_DATA.ch/CH_DESC"
WHERE CONTAINS("AREA_NAME_DESCRIPTION",'Great Britain', FUZZY(0.8))
AND "AREA_LOCALE" = 'ENG'AND "LEVEL" = 1 ORDER BY "score" DESC
-- Example 2
-- User data is 'Cnada'
-- Fuzzy match result is the area id for 'Canada'
SELECT TOP 10 SCORE( ) as "score", "AREA_ID"
from "_SYS_BIC"."FPA_SPATIAL_DATA.ch/CH_DESC"
WHERE CONTAINS("AREA_NAME_DESCRIPTION",'Cnada', FUZZY(0.8)) AND
"AREA_LOCALE" = 'EN'AND "LEVEL" = 1 ORDER BY "score" DESC
```

The above code examples specify to return matches that are similar to <search_string> (Great Britian, Cnada) from the view created at 301. Optionally, you can control the degree of similarity using parameters. For example, FUZZY( ) specifies the degree of fuzziness expressed as value between 0.0 and 1.0, where 0.0 is very fuzzy, and 1.0 is exact. The similarity search performed in response to the above calls may be implemented in the application, in the database, or in an external system, for example. In the above code, the similarity search may be against the view created at 301, including the alternative geo-descriptors and the master geo-descriptors. As mentioned above, in one embodiment, the master geo-descriptors are included in the alternative geo-descriptor table (e.g., note: "United States" in the alternative area description table), which may improve the accuracy of results and reduce or eliminate the possibility of Other locales for alternative geo-descriptors may include "FR" for French (Etas Unis) and "SP" for Spanish (Estados Unidos), for example. As with the level described above, the locale limits the scope of the comparing operation, and the similarity search of the particular data element is further performed against a locale to improve speed and accuracy of the results.

Referring again to table 510 in FIG. 5, data elements in a location field of the customer data set may match multiple of the plurality of geo-descriptors. As mentioned above, "Columbia" may match with "Columbia" and "Gran Columbia." This may result in multiple areaIDs being stored in table 510. When this occurs, a user may be presented with the multiple geo-descriptors matching the particular data elements for selection. For instance, "Columbia" may be displayed next to a drop down box that includes the geo-descriptors "Columbia" and "Gran Columbia," as illustrated at 105 in FIG. 1. When a user selects the correct geo-descriptor, the unique areaID associated with the user selected geo-descriptor in table 404, for example, may be determined.

Referring again to FIG. 3, at 306 the results of the similarity search are sent to a client computer for user selection. At 307, the user selects the appropriate geo-descriptor provided by the similarity search. At 308, the areaID is determined from the selected goe-descriptor. At 309, the areaID is stored in association with previously unmatched unique locations. For example, referring to FIG. 5, the selected results of each similarity search may be written into the corresponding row of table 510 to produce table 511. In table 511, the previously unmatched rows/IDs now have area codes associated with them. These location ID-areaID associations may be used at consumption time to display data geospatially. For example, in one embodiment, at 310 shapes and master geo-descriptors may be joined (as at 301, but without the alternative geo-descriptors) using the areaIDs in the result table. Accordingly, each unique location in the customer's data may be mapped to a unique areaID and a corresponding shape for geospatial display.

FIG. 4 further illustrates yet another embodiment. In some applications, customer data may be stored using ISO country codes. For example, ISO 3166-1 is part of the ISO 3166 standard published by the International Organization for Standardization (ISO), and defines codes for the names of countries, dependent territories, and special areas of geographical interest. There are a few different sets of country codes: ISO 3166-1 alpha-2 (known as ISO2) are two-letter country codes, ISO 3166-1 alpha-3 (ISO3) are three-letter country codes, and ISO 3166-1 numeric (ISO-N) are three-digit country codes with script (writing system) independence. In one embodiment, a geospatial application may store a plurality of ISO country codes, where each is associated with one of the unique areaIDs. As illustrated in table 405, areaID 1000 (United States) is associated with ISO3 code USA and ISO2 code US. Similarly, areaID 1001 (Canada) is associated with CAN and CA, and areaID 1002 (France) is associated with FRA and FR. A user may specify that countries in an imported customer data set are represented as ISO country codes (e.g., ISO2 or ISO3), for example, and the data elements in a first location field (country) of the data set may be compared to the ISO country codes. Additionally, other location fields (state, city, etc.) may be compared to alternative geo-descriptors in the alternative geo-descriptor table (e.g., for state, city, etc.). If no match is found for the first location field with the ISO codes, then a similarity search is performed for the unmatched location field against the ISO codes, for example, and if no match is found for the other location fields with the alternative geo-descriptors, then a similarity search is performed for the unmatched location field against the alternative geo-descriptors, for example.

Hardware

Figure 6:
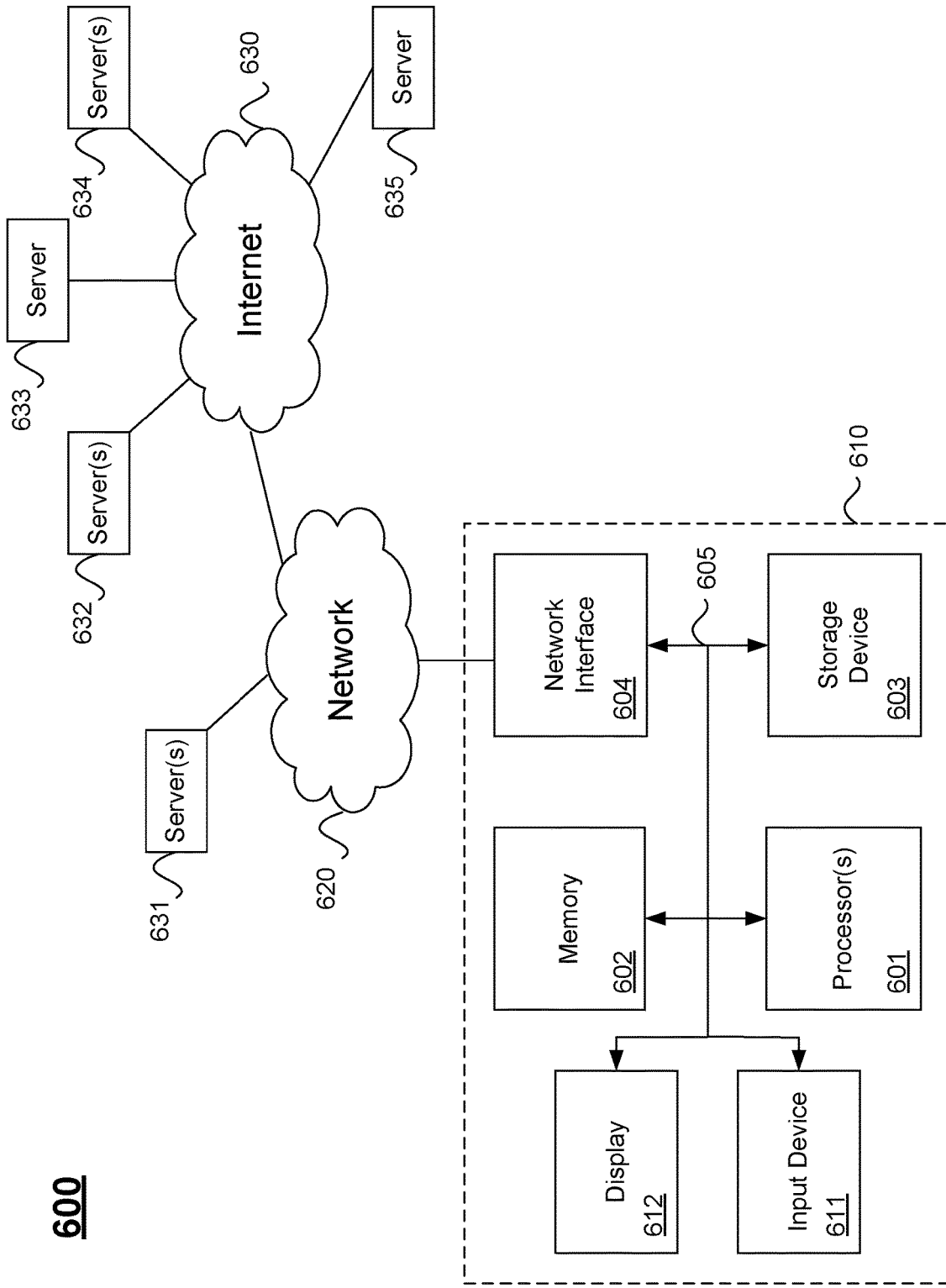
FIG. 6 illustrates hardware of a special purpose computing machine configured according to the above disclosure.

FIG. 6 illustrates hardware of a special purpose computing machine configured according to the above disclosure. The following hardware description is merely one example.

It is to be understood that a variety of computers topologies may be used to implement the above described techniques. An example computer system 610 is illustrated in FIG. 6. Computer system 610 includes a bus 605 or other communication mechanism for communicating information, and one or more processor(s) 601 coupled with bus 605 for processing information. Computer system 610 also includes a memory 602 coupled to bus 605 for storing information and instructions to be executed by processor 601, including information and instructions for performing some of the techniques described above, for example. This memory may also be used for storing programs executed by processor(s) 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 603 may include source code, binary code, or software files for performing the techniques above, for example. Storage device and memory are both examples of non-transitory computer readable storage mediums.

Computer system 610 may be coupled via bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized buses, for example.

Computer system 610 also includes a network interface 604 coupled with bus 605. Network interface 604 may provide two-way data communication between computer system 610 and a network 620. The network interface 604 may be a wireless or wired connection, for example. Computer system 610 can send and receive information through the network interface 604 across a local area network, an Intranet, a cellular network, or the Internet, for example. In the Internet example, a browser, for example, may access data and features on backend systems that may reside on multiple different hardware servers on prem 634 or across the network 632-635. One or more of servers 632-635 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

APPENDIX A

Example SQL query to populate a temporary table (Gpg330383c420) used for enrichment

```
UPSERT Gpg330383c420 (
    "LOCATIONID",
    "COUNTRY",
    "REGION",
```

```
            "SUBREGION1",
            "METADATA"
) SELECT
            "SRC"."LOCATIONID" ,
            CASE CN
        WHEN 1 THEN "AREAS"."COUNTRY_AREA_ID"
        ELSE null
        END AS "COUNTRY_AREA_ID" ,
            CASE CN
        WHEN 1 THEN "AREAS"."REGION_AREA_ID"
        ELSE null
        END AS "REGION_AREA_ID" ,
            CASE CN
        WHEN 1 THEN "AREAS"."SUBREGION1_AREA_ID"
        ELSE null
        END AS "SUBREGION1_AREA_ID" ,
            '{"match":"' || CASE CN
        WHEN 0 THEN 'none'
        WHEN 1 THEN 'single'
        ELSE 'multiple'
        END || '"',
        '"lookupSrcVersion":"1.1.13"' || CASE CN
            WHEN 0 THEN ''
            WHEN 1 THEN ''
            ELSE ',"areaIds":[' || "MATCHES" || ']'
            END || '}' AS "METADATA"
    FROM Gpg330383c420 AS "SRC"
    JOIN (
        SELECT
            "COUNTRY_AREA_NAME",
            "REGION_AREA_NAME",
            "SUBREGION1_AREA_NAME" ,
            FIRST_VALUE ( "COUNTRY_AREA_ID" ORDER BY RN ) AS
"COUNTRY_AREA_ID" ,
            FIRST_VALUE ( "REGION_AREA_ID" ORDER BY RN ) AS
"REGION_AREA_ID" ,
            FIRST_VALUE ( "SUBREGION1_AREA_ID" ORDER BY RN ) AS
"SUBREGION1_AREA_ID" ,
            COUNT("RN") AS "CN" ,
            STRING_AGG("SUBREGION1_AREA_ID",',') AS "MATCHES"
                FROM (
            SELECT
                "COUNTRY_AREA_ID",
                "REGION_AREA_ID",
                "SUBREGION1_AREA_ID" ,
                ROW_NUMBER( ) OVER ( PARTITION BY
"COUNTRY_AREA_NAME","REGION_AREA_NAME","SUBREGION1_AREA_N
AME" ORDER BY "COUNTRY_AREA_NAME" desc ) AS "RN" ,
                COUNT(*) OVER ( PARTITION BY
"COUNTRY_AREA_NAME","REGION_AREA_NAME","SUBREGION1_AREA_N
AME" ORDER BY "COUNTRY_AREA_NAME" desc ) AS "CN" ,
                "COUNTRY_AREA_NAME",
                "REGION_AREA_NAME",
                "SUBREGION1_AREA_NAME"
                        FROM (
            SELECT
                DISTINCT "COUNTRY"."AREA_ID" AS "COUNTRY_AREA_ID"
,
                "COUNTRY"."AREA_NAME" AS "COUNTRY_AREA_NAME" ,
                "REGION"."AREA_ID" AS "REGION_AREA_ID" ,
                "REGION"."AREA_NAME" AS "REGION_AREA_NAME" ,
                "SUBREGION1"."AREA_ID" AS "SUBREGION1_AREA_ID" ,
                "SUBREGION1"."AREA_NAME" AS
"SUBREGION1_AREA_NAME"
                        FROM (
                SELECT
                    DISTINCT
"COUNTRY_NAMEE03F1959D0AFC71AE10000000AA51326" ,
                        "AREA_ID" ,
                        "AREA_NAME" ,
                        "PARENT_AREA_ID"
                            FROM (
                    SELECT
                        DISTINCT
"COUNTRY_NAMEE03F1959D0AFC71AE10000000AA51326"
                            FROM Gpg330383c420
                ) JOIN (
                    SELECT
                        DISTINCT "AREA_ID" ,
```

```
                    "AREA_NAME",
                    "AREA_NAME_DESCRIPTION",
                    "PARENT_AREA_ID"
                        FROM
"_SYS_BIC"."FPA_SPATIAL_DATA.choropleth/CHOROPLETH_DESC"
                            WHERE LEVEL = 1
        ) ON LCASE (
"COUNTRY_NAMEE03F1959D0AFC71AE10000000AA51326" ) = (
            CASE
                WHEN EXISTS (
                    SELECT
                        "AREA_NAME_DESCRIPTION"
                            FROM
"_SYS_BIC"."FPA_SPATIAL_DATA.choropleth/CHOROPLETH_DESC"
                                WHERE LEVEL = 1 AND
AREA_LOCALE = 'ENG' AND LCASE (
"COUNTRY_NAMEE03F1959D0AFC71AE10000000AA51326" ) = LCASE (
"AREA_NAME_DESCRIPTION" )
                ) THEN LCASE ( "AREA_NAME_DESCRIPTION" )
                        ELSE LCASE ( "AREA_NAME" )
                            END
        )
    ) AS "COUNTRY"
    JOIN (
        SELECT
            DISTINCT
"STATE_NAMEE13F1959D0AFC71AE10000000AA51326",
                "AREA_ID",
                "AREA_NAME",
                "PARENT_AREA_ID"
                    FROM (
        SELECT
            DISTINCT
"STATE_NAMEE13F1959D0AFC71AE10000000AA51326"
                            FROM Gpg330383c420
        ) JOIN (
            SELECT
                DISTINCT "AREA_ID",
                    "AREA_NAME",
                    "AREA_NAME_DESCRIPTION",
                    "PARENT_AREA_ID"
                        FROM
"_SYS_BIC"."FPA_SPATIAL_DATA.choropleth/CHOROPLETH_DESC"
                            WHERE LEVEL = 2
        ) ON LCASE (
"STATE_NAMEE13F1959D0AFC71AE10000000AA51326" ) = (
                CASE
                    WHEN EXISTS (
                        SELECT
                            "AREA_NAME_DESCRIPTION"
                                FROM
"_SYS_BIC"."FPA_SPATIAL_DATA.choropleth/CHOROPLETH_DESC"
                                    WHERE LEVEL = 2 AND
AREA_LOCALE = 'ENG' AND LCASE (
"STATE_NAMEE13F1959D0AFC71AE10000000AA51326" ) = LCASE (
"AREA_NAME_DESCRIPTION" )
                    ) THEN LCASE ( "AREA_NAME_DESCRIPTION" )
                            ELSE LCASE ( "AREA_NAME" )
                                END
            )
    ) AS "REGION" ON "COUNTRY"."AREA_ID" =
"REGION"."PARENT_AREA_ID"
        JOIN (
            SELECT
                DISTINCT
"COUNTY_NAMEE23F1959D0AFC71AE10000000AA51326",
                    "AREA_ID",
                    "AREA_NAME",
                    "PARENT_AREA_ID"
                        FROM (
            SELECT
                DISTINCT
"COUNTY_NAMEE23F1959D0AFC71AE10000000AA51326"
                                FROM Gpg330383c420
            ) JOIN (
                SELECT
                    DISTINCT "AREA_ID",
                        "AREA_NAME",
```

-continued

```
                    "AREA_NAME_DESCRIPTION" ,
                    "PARENT_AREA_ID"
                                FROM
"_SYS_BIC"."FPA_SPATIAL_DATA.choropleth/CHOROPLETH_DESC"
                                      WHERE LEVEL = 3
                ) ON LCASE (
"COUNTY_NAMEE23F1959D0AFC71AE10000000AA51326" ) = (
                     CASE
                       WHEN EXISTS (
                          SELECT
                              "AREA_NAME_DESCRIPTION"
                                FROM
"_SYS_BIC"."FPA_SPATIAL_DATA.choropleth/CHOROPLETH_DESC"
                                      WHERE LEVEL = 3 AND
AREA_LOCALE = 'ENG' AND LCASE (
"COUNTY_NAMEE23F1959D0AFC71AE10000000AA51326" ) = LCASE (
"AREA_NAME_DESCRIPTION" )
                                ) THEN LCASE ( "AREA_NAME_DESCRIPTION" )
                                          ELSE LCASE ( "AREA_NAME" )
                                          END
                       )
                ) AS "SUBREGION1" ON "REGION"."AREA_ID" =
"SUBREGION1"."PARENT_AREA_ID"
          )
      )
            GROUP BY
                "COUNTRY_AREA_NAME",
                "REGION_AREA_NAME",
                "SUBREGION1_AREA_NAME"
      ) AS "AREAS" ON ( LCASE (
"COUNTRY_NAMEE03F1959D0AFC71AE10000000AA51326" ) = LCASE (
"COUNTRY_AREA_NAME" ) )
          AND ( LCASE (
"STATE_NAMEE13F1959D0AFC71AE10000000AA51326" ) = LCASE (
"REGION_AREA_NAME" ) )
          AND ( LCASE (
"COUNTY_NAMEE23F1959D0AFC71AE10000000AA51326" ) = LCASE (
"SUBREGION1_AREA_NAME" ) )
    LIMIT 2000000
```

What is claimed is:

1. A method comprising:
storing a plurality of unique area identifications each associated with a corresponding geospatial shape of geospatial shapes, wherein the plurality of unique area identifications are stored in a first field in one or more tables and the geospatial shapes are stored in a second field in the one or more tables;
storing a plurality of master geo-descriptors each associated with one of the unique area identifications, wherein the plurality of master geo-descriptors are stored in a third field in the one or more tables and the unique area identifications are stored in a fourth field in the one or more tables;
storing a plurality of alternative geo-descriptors in association with the unique area identifications, wherein each unique area identification is associated with a plurality of the alternative geo-descriptors, the plurality of alternative geo-descriptors are alternate representations of each of the master geo-descriptors, the plurality of alternative geo-descriptors and the master geo-descriptors are stored in a fifth field in the one or more tables, and the unique area identifications are stored in a sixth field in the one or more tables;
receiving a data set comprising at least one location field to be mapped to the unique area identifications;
joining the one or more tables; and
comparing data elements in the at least one location field to the plurality of alternative geo-descriptors, wherein when particular data elements match one of the plurality of alternative geo-descriptors, determining the unique area identification associated with the matched one of the plurality of alternative geo-descriptors and associating the unique area identification with the matching data elements; and
when a particular data element does not match any of the plurality of alternative geo-descriptors:
performing a similarity search of the particular data element against the plurality alternative geo-descriptors to return a result set comprising one or more of the plurality alternative geo-descriptors having a likelihood greater than a threshold;
presenting the result set to a user for selection; and
determining the unique area identification associated with the user selected result.

2. The method of claim 1 wherein the plurality of master geo-descriptors and the associated plurality of unique area identifications are stored in an area description table, the unique area identifications and the associated geospatial shapes are stored in a shape table, and the plurality of alternative geo-descriptors and the associated unique area identifications are stored in an alternative description table.

3. The method of claim 1 further comprising, sending data elements that do not match any of the plurality of alternative geo-descriptors for display to a user, wherein the similarity search is performed only for one particular displayed data element when the user selects the particular displayed data element.

4. The method of claim 1 further comprising, when data elements in the at least one location field match multiple of the plurality of alternative geo-descriptors, then:

presenting the multiple of the plurality alternative geo-descriptors matching the particular data elements to a user for selection; and
determining the unique area identification associated with the user selected alternative geo-descriptor.

5. The method of claim 1 further comprising, based on said comparing data elements step, generating a table comprising a first field storing each unique location in the data set, a second field storing either none, one, or multiple unique area identifications, and a third field storing metadata describing a result of the comparing data elements step.

6. The method of claim 1 further comprising storing a locale in association with each of the plurality of alternative geo-descriptors, the locale specifying a language of a particular geo-descriptor, wherein the locale limits the scope of said comparing data elements step, and wherein the similarity search of the particular data element is further performed against at least one locale.

7. The method of claim 1 further comprising associating a geo-level descriptor with the unique area identifications, the geo-level descriptor specifying a geographic hierarchy, wherein the geo-level descriptor limits the scope of said comparing data elements step, and wherein the similarity search of the particular data element is further performed against at least one geo-level descriptor.

8. The method of claim 1 further comprising storing a plurality of ISO country codes each associated with one of the unique area identifications, wherein a user specifies that countries in the data set are represented as ISO country codes, said comparing data elements comprising:
comparing data elements in a first location field of the at least one location field of the data set to the ISO country codes;
comparing data elements in a second location field of the at least one location field of the data set to the plurality of alternative geo-descriptors; and
wherein the similarity search is performed for the second location field when the second location field does not match any of the plurality of alternative geo-descriptors, and the similarity search is performed for the first location field against the ISO country codes when the first location field does not match any of the stored ISO country codes.

9. The method of claim 1 wherein:
the plurality of master geo-descriptors are stored in a first field of a first table and the plurality of unique area identifications are stored in a second field of the first table;
the unique area identifications are stored in a first field of a second table and the geospatial shapes are stored in a second field of the second table; and
the plurality of alternative geo-descriptors and the master geo-descriptors are stored in a first field of a third table and the unique area identifications are stored in a second field of the third table; and
the method further comprising, before said comparing step, joining the first table, the second table, and the third table.

10. The method of claim 9 wherein the joining step is performed during a data reconciliation phase, and during a data consumption phase occurring after the data reconciliation phase the method comprising joining the first table and the second table.

11. The method of claim 1 further comprising, based on said comparing data elements step, generating a table comprising a first field storing each unique location in the data set, a second field storing either none, one, or multiple unique area identifications, and a third field storing metadata describing a result of the comparing data elements step, identifying data values in the table;
accessing formatting information for the data values; and
generating one or more arrays of formatted data.

12. A non-transitory machine-readable medium storing a program executable by at least one processing unit of a device, the program comprising sets of instructions for:
storing a plurality of unique area identifications each associated with a corresponding geospatial shape of geospatial shapes, wherein the plurality of unique area identifications are stored in a first field in one or more tables and the geospatial shapes are stored in a second field in the one or more tables;
storing a plurality of master geo-descriptors each associated with one of the unique area identifications, wherein the plurality of master geo-descriptors are stored in a third field in the one or more tables and the unique area identifications are stored in a fourth field in the one or more tables;
storing a plurality of alternative geo-descriptors in association with the unique area identifications, wherein each unique area identification is associated with a plurality of the alternative geo-descriptors, the plurality of alternative geo-descriptors are alternate representations of each of the master geo-descriptors, the plurality of alternative geo-descriptors and the master geo-descriptors are stored in a fifth field in the one or more tables, and the unique area identifications are stored in a sixth field in the one or more tables;
receiving a data set comprising at least one location field to be mapped to the unique area identifications;
joining the one or more tables; and
comparing data elements in the at least one location field to the plurality of alternative geo-descriptors, wherein when particular data elements match one of the plurality of alternative geo-descriptors, determining the unique area identification associated with the matched one of the plurality of alternative geo-descriptors and associating the unique area identification with the matching data elements; and
when a particular data element does not match any of the plurality of alternative geo-descriptors:
performing a similarity search of the particular data element against the plurality alternative geo-descriptors to return a result set comprising one or more of the plurality alternative geo-descriptors having a likelihood greater than a threshold;
presenting the result set to a user for selection; and
determining the unique area identification associated with the user selected result.

13. The non-transitory machine-readable medium of claim 12 wherein the program further comprises instructions for sending data elements that do not match any of the plurality of alternative geo-descriptors for display to a user, and wherein the similarity search is performed only for one particular displayed data element when the user selects the particular displayed data element.

14. The non-transitory machine-readable medium of claim 12 wherein the program further comprises instructions for, when data elements in the at least one location field match multiple of the plurality of alternative geo-descriptors, then:
presenting the multiple of the plurality alternative geo-descriptors matching the particular data elements to a user for selection; and determining the unique area identification associated with the user selected alternative geo-descriptor.

15. The non-transitory machine-readable medium of claim 12 wherein the program further comprises instructions for, based on said comparing data elements step, generating a table comprising a first field storing each unique location in the data set, a second field storing either none, one, or multiple unique area identifications, and a third field storing metadata describing a result of the comparing data elements step.

16. The non-transitory machine-readable medium of claim 12 wherein the program further comprises instructions for storing a locale in association with each of the plurality of alternative geo-descriptors, the locale specifying a language of a particular geo-descriptor, wherein the locale limits the scope of said comparing data elements step, and wherein the similarity search of the particular data element is further performed against at least one locale.

17. The non-transitory machine-readable medium of claim 12 wherein the program further comprises instructions for associating a geo-level descriptor with the unique area identifications, the geo-level descriptor specifying a geographic hierarchy, wherein the geo-level descriptor limits the scope of said comparing data elements step, and wherein the similarity search of the particular data element is further performed against at least one geo-level descriptor.

18. The non-transitory machine-readable medium of claim 12 wherein the program further comprises instructions for storing a plurality of ISO country codes each associated with one of the unique area identifications and a user specifies that countries in the data set are represented as ISO country codes, said comparing data elements comprising:
    comparing data elements in a first location field of the at least one location field of the data set to the ISO country codes;
    comparing data elements in a second location field of the at least one location field of the data set to the plurality of alternative geo-descriptors; and
    wherein the similarity search is performed for the second location field when the second location field does not match any of the plurality of alternative geo-descriptors, and the similarity search is performed for the first location field against the ISO country codes when the first location field does not match any of the stored ISO country codes.

19. The non-transitory machine-readable medium of claim 12 wherein:
    the plurality of master geo-descriptors are stored in a first field of a first table and the plurality of unique area identifications are stored in a second field of the first table;
    the unique area identifications are stored in a first field of a second table and the geospatial shapes are stored in a second field of the second table;
    the plurality of alternative geo-descriptors and the master geo-descriptors are stored in a first field of a third table and the unique area identifications are stored in a second field of the third table;
    the program further comprises instructions for, before the comparing step, joining the first table, the second table, and the third table; and
    the joining step is performed during a data reconciliation phase, and during a data consumption phase occurring after the data reconciliation phase.

20. A computer system comprising:
a processor;
a memory; and
computer program code comprising instructions, executable on said one or more processors, the computer program code configured to:
store a plurality of unique area identifications each associated with a corresponding geospatial shape of geospatial shapes, wherein the plurality of unique area identifications are stored in a first field in one or more tables and the geospatial shapes are stored in a second field in the one or more tables;
store a plurality of master geo-descriptors each associated with one of the unique area identifications, wherein the plurality of master geo-descriptors are stored in a third field in the one or more tables and the unique area identifications are stored in a fourth field in the one or more tables;
store a plurality of alternative geo-descriptors in association with the unique area identifications, wherein each unique area identification is associated with a plurality of the alternative geo-descriptors, the plurality of alternative geo-descriptors are alternate representations of each of the master geo-descriptors, the plurality of alternative geo-descriptors and the master geo-descriptors are stored in a fifth field in the one or more tables, and the unique area identifications are stored in a sixth field in the one or more tables;
receive a data set comprising at least one location field to be mapped to the unique area identifications;
joining the one or more tables; and
compare data elements in the at least one location field to the plurality of alternative geo-descriptors, wherein
    when particular data elements match one of the plurality of alternative geo-descriptors, determine the unique area identification associated with the matched one of the plurality of alternative geo-descriptors and associate the unique area identification with the matching data elements; and
    when a particular data element does not match any of the plurality of alternative geo-descriptors:
        perform a similarity search of the particular data element against the plurality alternative geo-descriptors to return a result set comprising one or more of the plurality alternative geo-descriptors having a likelihood greater than a threshold;
        present the result set to a user for selection; and
        determine the unique area identification associated with the user selected result.

* * * * *